April 13, 1965 G. D. HAVILLE 3,178,003
SYSTEM FOR DETECTING PAPER MONEY OR THE LIKE
AND CONTROLLING DISPENSING APPARATUS
Filed June 9, 1961 5 Sheets-Sheet 1
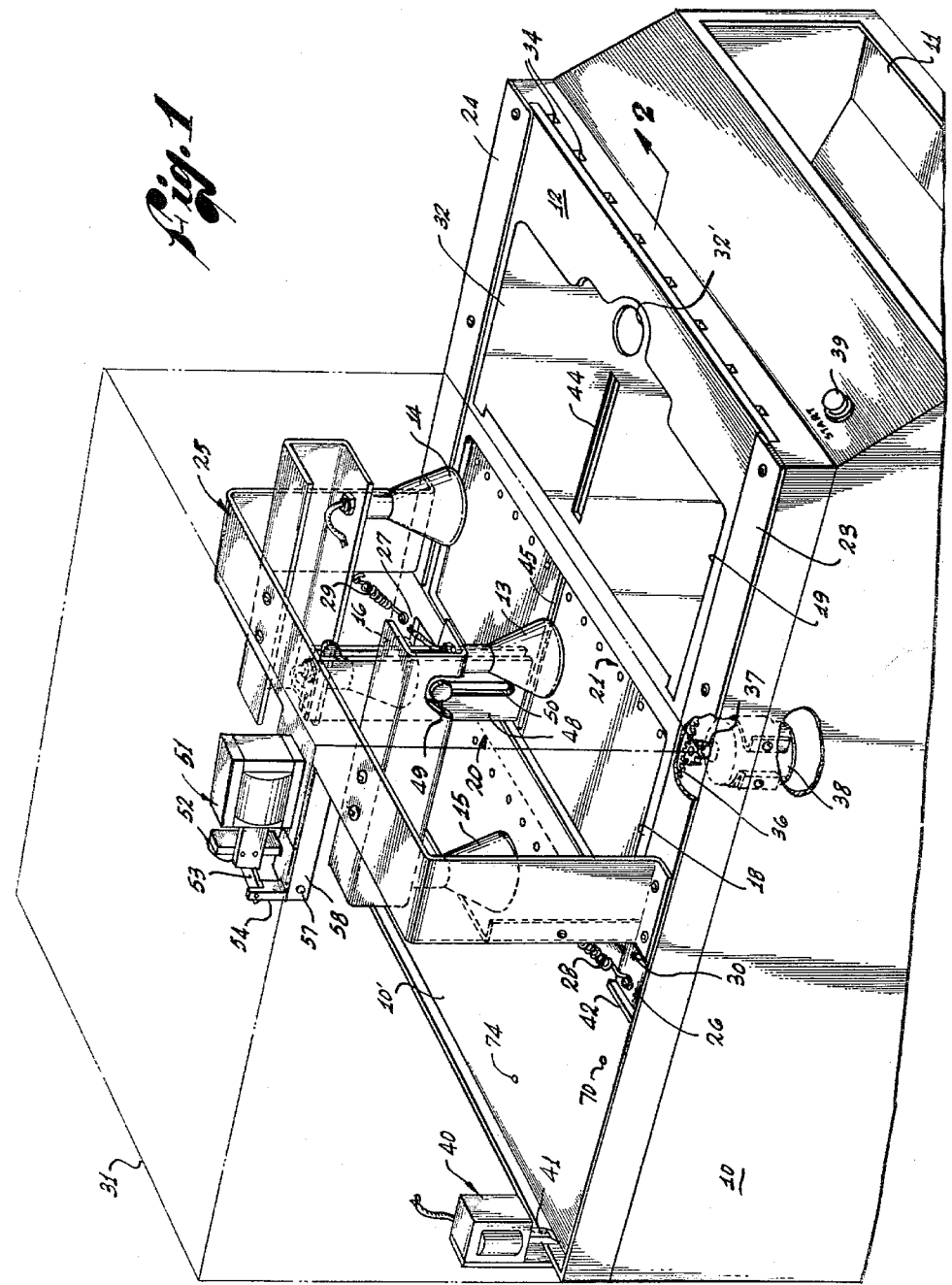
INVENTOR.
GEORGE D. HAVILLE
BY Fulwider Mattingly & Huntley
Attorneys

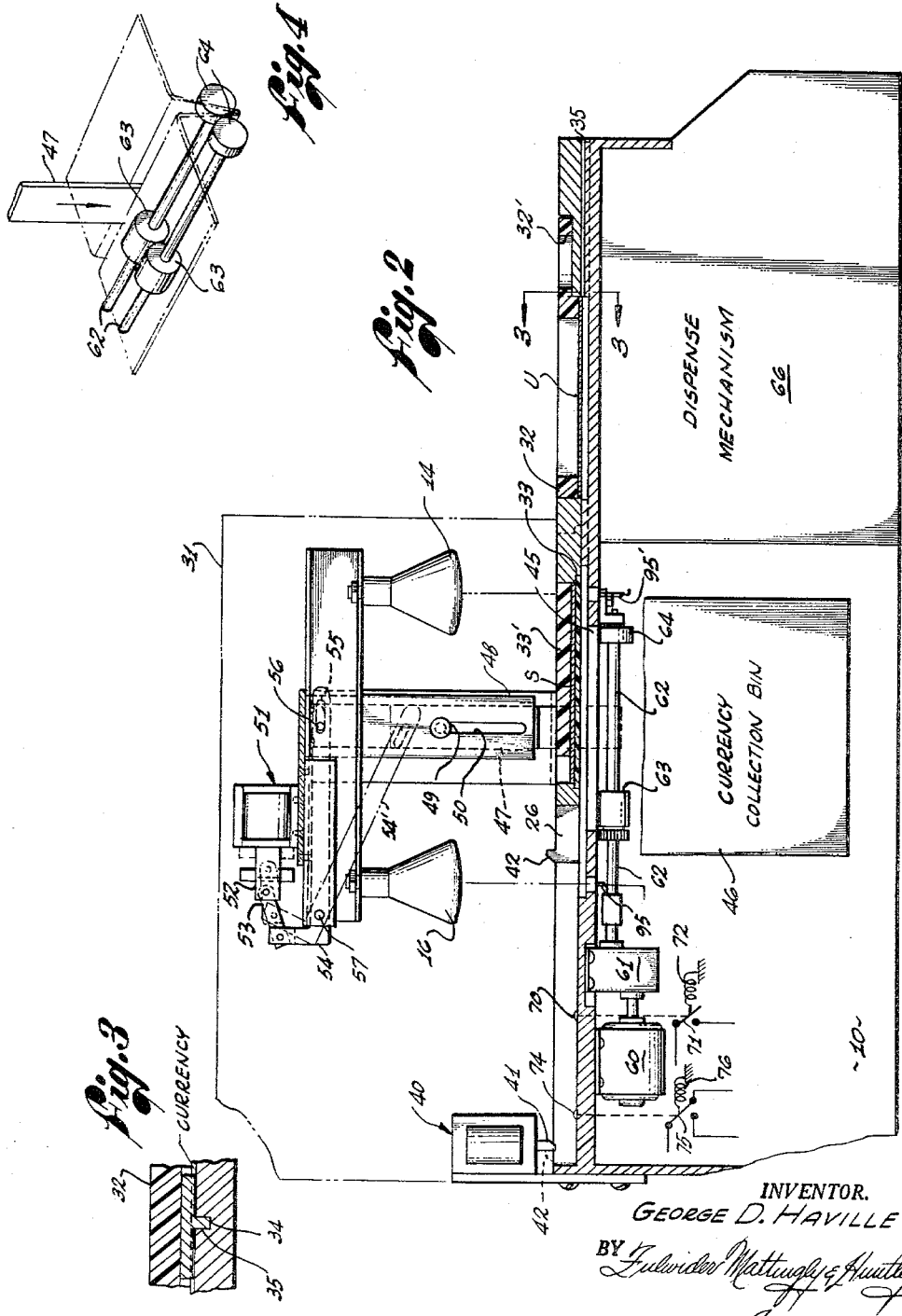

INVENTOR.
GEORGE D. HAVILLE

April 13, 1965  G. D. HAVILLE  3,178,003
SYSTEM FOR DETECTING PAPER MONEY OR THE LIKE
AND CONTROLLING DISPENSING APPARATUS
Filed June 9, 1961  5 Sheets-Sheet 4

INVENTOR.
GEORGE D. HAVILLE
BY Fulwider Mattingly & Huntley
Attorneys

INVENTOR.
GEORGE D. HAVILLE 3,178,003
SYSTEM FOR DETECTING PAPER MONEY OR THE LIKE AND CONTROLLING DISPENSING APPARATUS
George D. Haville, Santa Barbara, Calif., assignor to Automatic Canteen Company of America, Chicago, Ill., a corporation
Filed June 9, 1961, Ser. No. 115,947
20 Claims. (Cl. 194—4)

This invention relates to facsimile-type systems, and more particularly to a unique system for comparing a paper bill or the like with a standard, and operating dispensing apparatus to make change and/or dispense merchandise for a genuine bill.

As is well known, merchandising through coin-operated machines is limited to the sale of low-priced items. Generally speaking, the items that can be sold through dispensing machines are those that can be obtained for only a small number of coins. As will be appreciated, there is little desire on the part of the average consumer to equip himself with a sizable number of coins of various values, for the purpose of going to a machine to purchase items he desires.

To accommodate customers who may want to purchase an item from a machine that is operable only with coins of low value, e.g., nickels and dimes, coin-changing machines have been developed. Certain coin-changers are separate from the dispensing machine, and are placed in the vicinity of the dispensing machine. Thus a consumer can readily change a larger coin, such as a half-dollar or quarter, to obtain the smaller change with which to operate the dispensing machine. Still other coin-changers are incorporated in the dispensing machines, to enable a consumer to operate the dispensing machine with a larger coin than is needed, and thereby obtain selected merchandise along with an amount in change that is the difference between the cost of the merchandise and the coin inserted in the machine.

In order to extend the versatility and utility of dispensing machines, considerable time, effort and expense have been devoted to the development of devices for changing paper money and/or dispensing merchandise and change for paper money. In devices of this type that have heretofore been produced, a bill is placed in a slot or tray, and is tested to determine whether it is authentic. Such testing may be effected either photoelectrically or electromagnetically.

Photoelectric detection is carried out by holding the bill stationary over an array of fixed photoelectric devices or cells, and illuminating the bill with a source of light. The light may be arranged on the same side of the bill as the cells, so as to be reflected from the bill to the cells, or on the side of the bill opposite the cells, so as to be transmitted through the bill to the cells. In either case, each cell functions as a resistive device that assumes a value of resistance corresponding to the intensity of the light impinging on its photosensitive element. Typically, the resistance of such a cell is low when it is illuminated with a bright light, and is high when the illuminating source is dim.

A detection network is coupled to the array of cells, and is adapted to operate a change or dispense mechanism only if the resistances of the cells are in accordance with a predetermined pattern, which pattern has been determined with the use of a genuine bill. If this pattern exists, the bill is accepted as genuine, and change or merchandise is dispensed therefor. If this pattern does not exist, the bill is not accepted, but is returned to the consumer.

Bill changing systems of the type above described can be made fairly accurate, so as not to accept any form of paper that does not give the proper pattern for the resistance values of the photocells, e.g., genuine bills of improper denominations, counterfeit bills, play money and the like. However, such bill detection and changing mechanisms reject many bills of the proper denomination that do not cause the photocell characteristics to fall in precisely the predetermined pattern above mentioned.

There are several reasons for such fine discrimination. For example, a number of such bills of different ages, and also bills of the same age, have been found to differ markedly in many respects, due to the fact that each bill is handled differently than the others. Light reflected from or transmitted through points on a crisp, new bill adjacent the various photocells differs considerably from that reflected from or transmitted through the same points on a limp, dirty bill. Further, light reflected from or transmitted through such points on two bills may differ markedly in intensity because one has been rendered more opaque than the other as a result of more frequent handling in which skin oils were deposited thereon from the fingers of those through whose possession the bill passed.

In bill detection and changing devices of the type described, an attempt is made to set the sensitivity of the detection means to permit acceptance of genuine bills of a given denomination whose light reflecting and light transmission characteristics fall within a prescribed range. However, even within this range, such devices may reject genuine bills wherein the dimensions differ markedly from the one that was used in setting up the desired pattern for the resistances of the photocells.

It has been found, for example, that a bill may stretch as a result of hard usage. Also, a little noted fact is that the printed portions on the fronts and backs of bills of the same denomination are not always in the same locations on the bills. Thus, although two bills may be of the same size, the borders of the printed portions on the faces of two bills may be located in different positions relative to the edges of the bills. Also, the relative positions of the printed portions on the front and back of one bill may differ markedly from the relative positions of the printed portions on the front and back of another bill of the same denomination.

In view of the various differences in dimensions of bills or portions thereof, bill detecting and changing mechanisms of the type described reject such bills because their light reflecting or transmitting characteristics, at the points adjacent the photosensitive elements of the cells, are not proper to result in the cells developing the proper resistance values.

In electromagnetic bill detecting and changing devices, use is made of the fact that the ink employed in printing many bills has a magnetic property. In such devices, a bill is inserted in a slot and subjected to movement past a magnetic pickup device. The pickup develops output currents that vary in accordance with the magnetic properties of the portion of the bill that moves past it. As is the case of the photoelectric type of bill detection mechanisms, the electromagnetic type of detection device requires that the current variations follow the predetermined pattern before control apparatus can function to accept the bill. However, the electromagnetic type of bill detection apparatus also rejects many genuine bills, and for the same reasons as the photoelectric type of detection apparatus.

In addition to the points above mentioned, prior art bill detection and changing devices are incapable of use to detect genuine bills of different denominations. As will be apparent, since a predetermined pattern of resistance current values is established for a single type of bill, and the associated control networks and apparatus can function only in response to such a precise pattern being established, then any genuine bill of a different denomination cannot produce this precise pattern of resistance values. To enable prior art technique to be used to detect bills of different denominations, it is necessary to provide complete separate systems for the different types of bills, including different sets of detection devices and networks for operation in response to respective resistance or current patterns. Such duplication of necessity results in a highly complex, bulky and costly machine.

It is an object of my invention to provide a unique system and method for paper money or the like that overcomes the above and other disadvantages of the prior art.

It is another object of my invention to provide a unique method and apparatus by which to photoelectrically compare an unknown bill with a standard, in a manner to minimize the effects of differences between the standard and a genuine bill of the same type.

A further object of my invention is to provide a unique bill comparison and detection system wherein the same circuits are capable of determining the genuineness of bills of different denominations.

A still further object of my invention is to provide a unique system for dynamically scanning a plurality of lines on a standard and of an unknown paper item to determine whether they are similar, and which is suitable for using any desired paper item as a standard without any alterations in the system or in the characteristics of its component parts.

It is yet another object of my invention to provide a unique paper money comparison and detection system, which utilizes a minimum number of component parts of simple design and rugged construction, capable of reliable operation over a long operating life.

The above and other objects and advantages of my invention will become apparent from the following description taken in conjunction with the accompanying drawing of an illustrative embodiment thereof, in which:

FIGURE 1 is a fragmentary perspective view of dispensing apparatus, showing a tray slidable on a bed and having receptacles for a standard bill and an unknown bill, showing the arrangement of illumination means and photocells between which the bills pass, and showing a bill stripper mechanism for operation to remove the unknown bill from its receptacle following comparison and determination of its genuineness;

FIGURE 2 is a sectional view taken along the line 2—2 of FIGURE 1, showing the arrangement of the motor drive for removing accepted bills and depositing them in a collection bin, and showing a dispense mechanism to be actuated after the bill accepted has been deposited in the collection bin;

FIGURE 3 is a fragmentary sectional view taken along the line 3—3 of FIGURE 2, showing how the tray at the rear border of the receptacle for the unknown bill is provided with spaced tongue elements that ride in grooves in the bed;

FIGURE 4 is a perspective view of the rollers by which a bill is stripped from the tray after its genuineness has been detected;

Figure 5A:
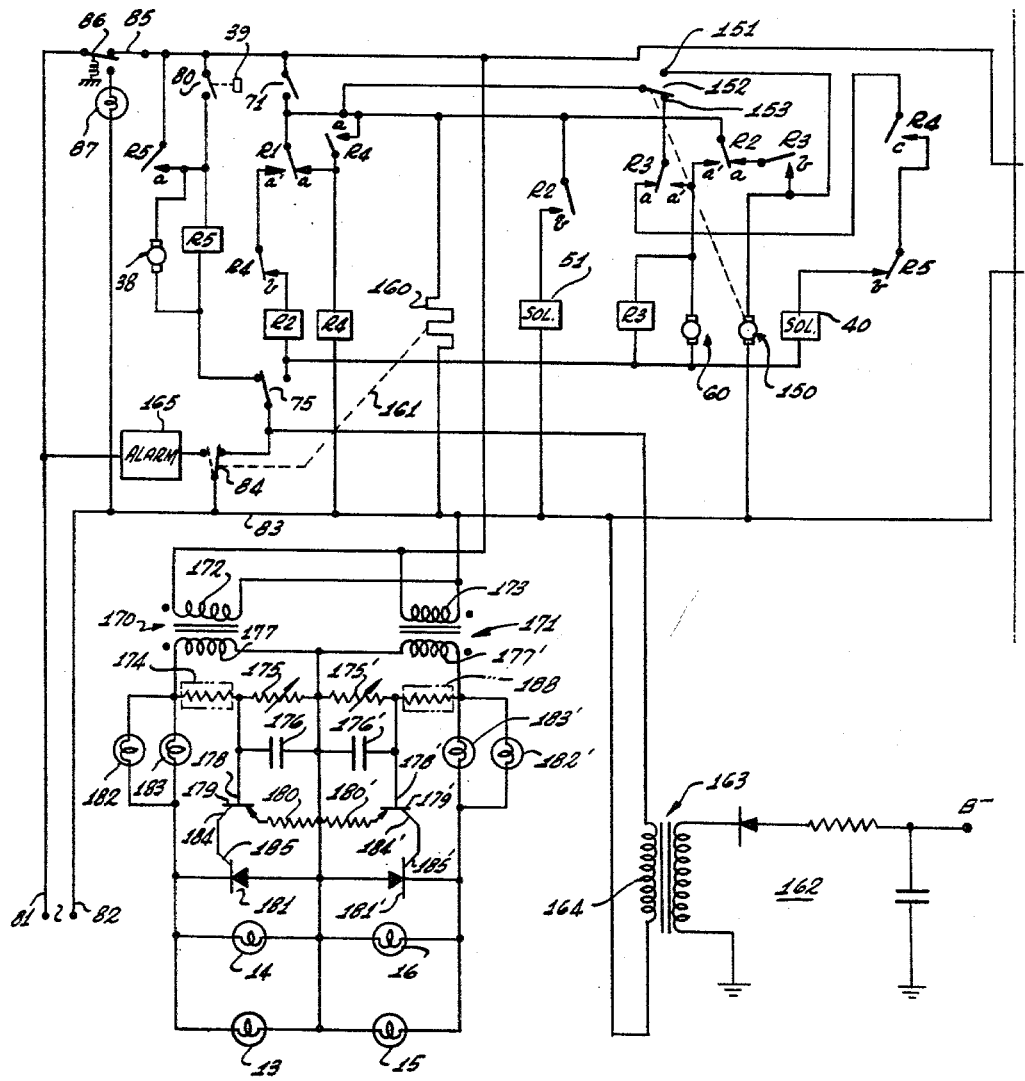
FIGURES 5a and 5b are schematic diagrams of my unique control network for actuating the mechanism of FIGURE 1 to either accept or reject a bill placed in the unknown tray slot.

Referring to FIGURE 1, there is shown a housing 10 which at one end is provided with an opening or chute 11 through which to dispense items of merchandise and/or change. The upper surface of the housing 10 is a flat bed 10' on which a tray 12 is supported for sliding movement, such tray 12 being movable under an overhead light source, shown as lamps 13–16.

The tray 12, which preferably is made of opaque plastic material, has a pair of spaced cutouts that form receptacles 18, 19 for bills or other paper elements that are to be compared. The standard, i.e., the bill with which comparison is to be made, is located in one of the receptacles 18, and the unknown is placed in the receptacle 19. The tray 12 is moved along the bed 10' and comparison is made by determining, from fixed points over which the bills pass, the degree of similarity of the light transmission characteristics of the bills.

For the fixed points at which my system observes the light transmission characteristics of the moving bills, I provide parallel rows 20, 21 of spaced photocell devices that are arranged so that corresponding portions of the bills pass over corresponding photocells in the two rows. In this operation, I utilize the variable resistance characteristics of the cells for comparison purposes. If the intensity of the light reaching all corresponding cells through the moving bills varies in the same manner, the system determines that the unknown is the same as the standard, accepts the unknown by withdrawing it from the receptacle 19, and then dispenses change or merchandise through the chute 11. But if the comparison is disproportionate, i.e., if the changing resistance values of corresponding cells are markedly different, the unknown bill is not accepted, and no change or merchandise is dispensed through the chute 11.

A more detailed explanation of the structure of the system of my invention will be made with reference to FIGURES 2–4 along with FIGURE 1. As shown, the bed 10' of the housing 10 is formed as a shallow channel to matingly receive the tray 12, so that the sides of the tray 12 slidably engage the confronting walls of the channel. To prevent vertical movement of the tray, rails 23, 24 are secured to the housing that extend a short distance inwardly of the edges of the tray and along the upper surface thereof.

The tray 12 is normally biased to an "extended" position wherein the end thereof adjacent the receptacle 19 is held near the adjacent end of the housing 10. For this purpose (see FIGURE 1), an inverted U-shaped bracket 25 is provided that has its legs secured to the rails 23, 24. The tray 12 is provided with edge extensions 26, 27 that extend beyond the rear receptacle 18, and tension springs 28, 29 are secured at their ends to the legs of the bracket 25 and to the extensions 26, 27. With this arrangement, the springs 28, 29 provide a horizontal component of force to constantly urge the tray 12 to its extended position shown in FIGURE 1. To prevent the tray 12 from being forced beyond the end of the housing 10, a suitable stop member is provided, such as a pin 30 on the leg extension 26 that is adapted to abut the rear end of the rail 23 when the tray 12 reaches its extended position.

As shown in phantom in FIGURES 1 and 2, a cover 31 is provided on the housing that extends from a plane forward of the row 21 of photocells to the rear of the bed 10'. With the tray 12 in its extended position, the receptacle 19 is forward of the cover 31 and is accessible to the consumer, so that he can place a bill therein for which he wants to obtain an item of merchandise and/or change. The receptacle is provided with a flat transparent lid 32, e.g., a transparent plastic lid, which is adapted for pivotal movement along a line adjacent its rear edge. To place a bill in the receptacle 19, one raises the front of the lid 32, as by grasping it in a finger opening 32' therein, and lays the bill flat on the bed 10' in the receptacle 19. He then lowers the lid, whereby the bill, indicated as U in FIGURE 2, is held down by the lid.

The standard bill, S, that is located in the receptacle 18 is sandwiched between two transparent sheets 33, 33'. The bottom sheet 33 is fixed, as by being bonded to the tray 12, and the top sheet 33' is removable. In this manner, the top sheet may be removed to change the standard when desired.

To insure that a bill placed in the receptacle 19 will move with the tray 12 (see FIGURES 1 and 3), the bed 10' is provided with parallel grooves 34, and the tray 12 is provided with spaced ribs 35 that ride in the grooves 34. The ribs 35 at one end are flush with the outer edge of the receptacle 19. Accordingly, the outer edge of a bill U in the receptacle 19 is caught by the rear edge of the receptacle and carried with the tray 12 when it is retracted.

Movement of the tray 12 rearwardly against the tension of the springs 28, 29 is effected automatically. Such movement may be carried out in any suitable manner. For example, as shown in FIGURE 1, a rack and pinion arrangement is employed wherein the tray 12 is provided on its lower surface at one edge with a rack 36 and a pinion 37 engaging the rack 36 is operated by motor 38. When the motor 38 is energized, it rotates the pinion 37 in a direction to force the tray 12 rearwardly for the desired scanning movement.

Scanning movement of the tray 12 is initiated through a start button 39 located on the forward end of the housing 10. When the start button 39 is depressed, the motor 38 is energized to cause the tray 12, through the rack and pinion mechanism 36, 37, to move to the rear of the housing 10. Such movement of the tray 12 continues to a point where the tray is latched in position. In this connection, a solenoid 40 is secured to the rear end of the housing 10 and is provided with a plunger 41 that is biased to a position in which it is located in the path of the extension 26 at the rear end of the tray 12.

The extension 26 has a raised end portion on which is formed a cam surface 42 that is in the path of the lower end of the plunger 41. The lower end of the plunger 41 is provided with a cooperating cam surface so that the plunger 41 can easily be cammed upwardly by the cam surface 42, and thereby allow the end of the extension 26 to pass under the plunger 41. As soon as the raised end of the extension 26 passes under it, the plunger 41 is immediately forced downwardly again, thereby to latch the tray 12 in position.

The tray will remain latched in this position until the solenoid 40 is energized to retract the plunger 41. In this connection, it is desired that, immediately upon retraction of the plunger 41 in this manner, the tray 12 is freed to be forced forwardly by the springs 28, 29. To aid in this return movement, the shaft of the motor 38 on which the pinion 37 is fixed is freely rotatable when the motor 38 is not energized. Accordingly, the rack and pinion arrangement does not hinder the return movement of the tray 12 to its extended position.

When the tray 12 has reached the retracted position in which it is latched by the plunger 41 of the solenoid 40, the stage is set for the system to accept the bill in the receptacle 19, if it has been found to be like that one in the receptacle 18. To enable the bill in the receptacle 19 to be collected before effecting a dispense operation, means are provided for forcing the bill through the top of the housing 10. Referring to FIGURES 1 and 2, elongated slots 44, 45 are provided in the lid 32 and in the bed 10'. With this arrangement, the slots 44, 45 are aligned when the tray 12 is latched in its retracted position. The length of the slot 45 is greater than the width of the bill.

If the bill in the receptacle 19 is determined to be genuine, and is to be collected, it is forced through the slot 45 into the interior of the housing 10, as into a currency collection bin 46 (see FIGURE 2). For thus stripping the bill from the receptacle 19, a thin blade element 47 is employed that is adapted for vertical movement, and is positioned so that its lower end can pass through the slots 44, 45. As shown, the stripper blade 47 is guidably supported between a pair of plates 48 fixed to the bracket 25, as by means of pins 49 on the blade 47 that ride in slots 50 in the plates 48.

Vertical positioning and movement of the stripper blade 47 is effected by a solenoid 51, the plunger 52 of which is coupled to the upper end of the blade 47 through a link 53 and a crank arm 54. The crank arm 54, which is shown as an L-shaped element, has an elongated arm 54' which at one end extends between the plates 48, and has a slot 55 in which a pin 56 on the stripper blade 47 rides. The crank element 54 is mounted for pivotal movement adjacent the opposite end of the elongated arm 54', as on a pin 57 that is secured to a fixed arm 58 extending from the bracket 25.

With the above-described arrangement for the stripper blade 47, the plunger 52 of the solenoid 51 is normally biased to an outer position in which it holds the crank element 54 so that its elongated arm 54' is horizontal, and the stripper blade 47 is in an uppermost position. When the solenoid 51 is energized, its plunger 52 is retracted to effect clockwise movement of the crank element 54, thereby forcing the stripper blade 47 downwardly to cause its lower end to pass through the slots 44, 45. Thus, a bill in the receptacle 19 is engaged by the lower end of the stripper blade 47, in a maneuver in which the bill is effectively folded at its center, and such center portion is carried into the interior of the housing 10.

In actual operation, the stripper blade 47 moves only a short distance into the interior of the housing 10, so that end portions of the bill must still be carried into the interior of the housing before the tray is cleared. To complete clearing of the tray, so that the bill is deposited in the collection bin 46, there is provided a motor 60 within the housing 10 that operates through a suitable gear mechanism 61 to rotate a pair of shafts 62 in opposite directions. On the ends of the shaft 62 are spaced cylindrical elements 63, 64 of soft material, such as rubber, and which bear against each other.

The shafts 62 are positioned so that they are on opposite sides of the slot 45, and the line through the points of contact of the rollers 63, 64 is directly beneath the slot 45 (see FIGURE 4). Further, the distance between the confronting radial faces of the rollers 63, 64 is less than the width of a bill. As shown in FIGURE 2, the stripper blade 47 in its lowermost position passes between the shafts 62 and intermediate the rollers 63, 64. Thus, the midportion of the bill carried by the stripper blade 47 is engaged by the rollers 63, 64 and carried between them. Due to the rotation of the rollers 63, 64, the bill is passed below the rollers and into the collection bin 46. After such collection, the dispense mechanism, indicated at 66 in FIGURE 2, operates as previously described.

The above-described operations are carried out in a predetermined sequence by unique control means of my invention. The beginning and end of such sequence is controlled by the movement of the tray 12, and to this end (see FIGURES 1 and 2), a spring-biased pushbutton 70 extends above the surface of the bed 10' in the path of the extension 26 of the tray 12, and is adapted to be depressed by the extension 26 to initiate the scan sequence. As shown in FIGURE 2, the pushbutton 70 when depressed is adapted to close a switch 71 that is normally biased, as at 72, to an open position. Preferably, the closure of the switch 71, to start the scan sequence, is effected immediately after the rear edges of the receptacles 18, 19 appear over the respective rows 20, 21 of photocells.

The end of the scan sequence is determined through actuation of a pushbutton 74 that is located in the path of the tray 12, and is depressed thereby in the same manner as the pushbutton 70. As shown in FIGURE 2, the pushbutton 74 is adapted when depressed to actuate a single-pole, double-throw switch 75, the movable arm of which is normally biased, as at 76, into engagement with one fixed contact, but which is forced into engagement with the other fixed contact when the pushbutton 74 is depressed.

The actuation of the switch 75 terminates the scan sequence, following which the solenoid 40 can be energized for retracting the plunger 41 and allowing the tray 12 to return to its extended position.

Figure 5B:
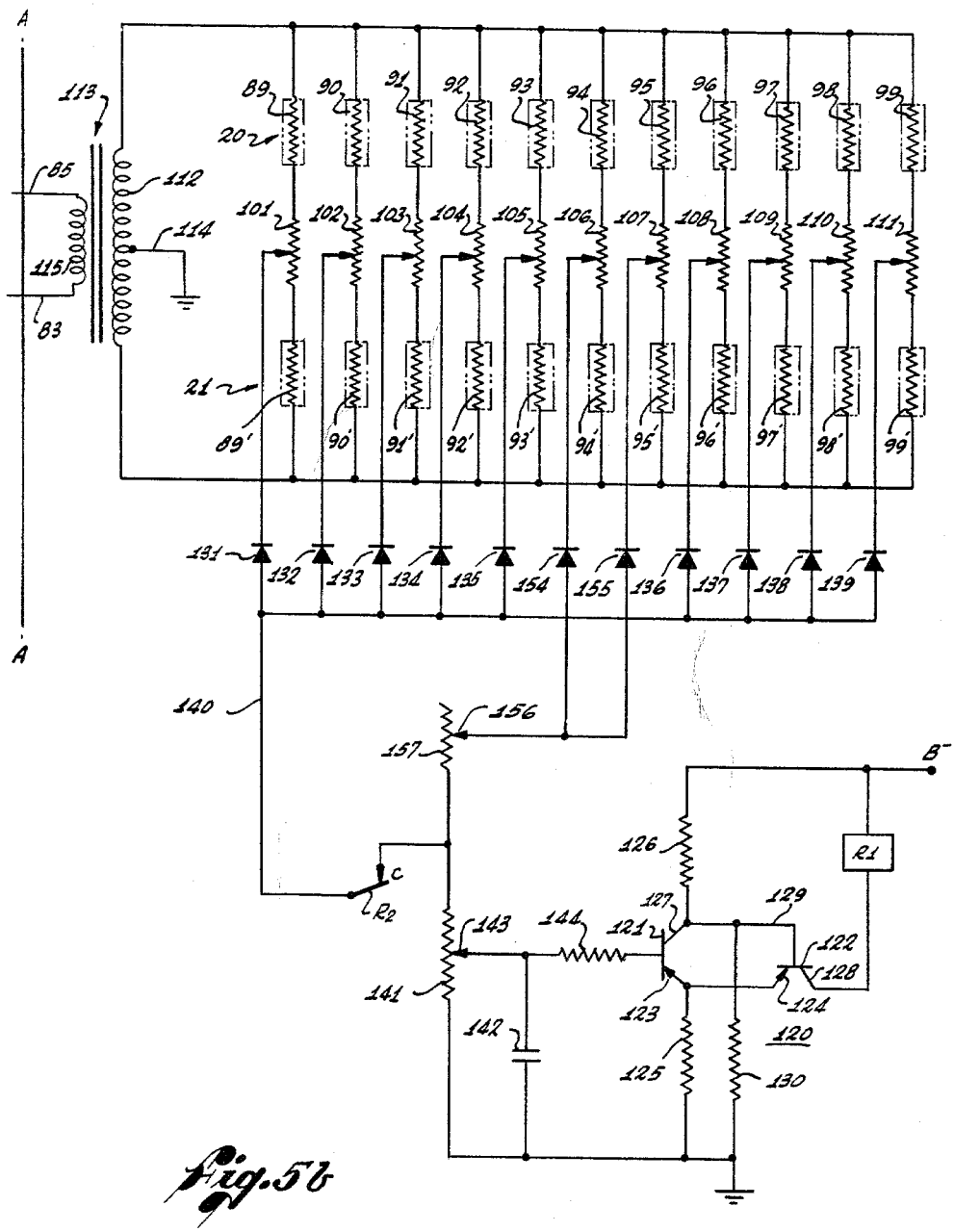

Control means of my invention for cooperatively relating the operations of the various switches, motors, solenoids, illumination sources and photocells above-described will be explained with reference to FIGURES 5a and 5b along with FIGURES 1 and 2. As previously explained, the start button 39 is depressed to initiate the scan sequence, by causing the motor 38 to be energized. In FIGURE 5a, the start button 39 is shown adapted to close a normally open switch 80 for connecting the motor 38 to power supply leads 81, 82. In this connection, one power lead 82 is normally connected to the motor 38 through a bus 83, normally closed switch 84, and the switch 75. The switch 80 is connected between the motor 38 and a bus 85, such bus 85 being connected through a switch 86 to the other power lead 81.

The switch 86 operates to connect or disconnect the power lead 81 and the bus 85, depending upon whether the dispense mechanism 66 is empty or not. A conventional "empty" indicator lamp 87 is provided that is connected to one power lead 82, and is adapted to be connected through the switch 86 to the other power lead 81 whenever the dispense mechanism is empty. In the usual manner, the switch 86 is normally biased so as to connect the lamp 87 across the power leads, but is so arranged that so long as any item remains in the dispense mechanism, such item holds the switch 86 in the position in which power can be supplied to the control means.

After the start button 39 is depressed to close the switch 80 and start the tray drive motor 38, all subsequent operations are controlled through the functioning of the photocells. In FIGURE 5b, certain photocells in the row 20 are indicated at 89–99, and corresponding photocells of the row 21 are indicated at 89′–99′. Each of the photocells is shown schematically as a resistive element, and it will be understood that such resistance changes in value inversely with variations in the intensity of light impinging upon the photosensitive element of the photocell.

Corresponding pairs of photocells in the rows 20, 21 are arranged in a bridge circuit, and to this end the photocell pairs are connected in series with respective resistors 101–111 across the terminals of the secondary winding 112 of a transformer 113, such secondary winding 112 having a center-tap connection 114 to ground. The resistor associated with each cell pair has a sliding contact that is initially positioned so that, with the cells of the pair exposed to identical light intensity variations, and with power supplied to the transformer 113 through the primary winding 115 thereof, the voltage between the sliding contact and the center-tap connection 114, i.e., the output of the bridge, is a minimum, e.g., zero.

Thus, if bills in the receptacles 18, 19 are the same types of bills, the resistances of the cells of each pair undergo substantially the same changes as the tray 12 is moved to pass the bills along the cells. Consequently, the voltage between the sliding contact and the center-tap connection 114 remains at zero. On the other hand, if the bills differ significantly in their light-transmission characteristics, the resistances of the cells in the bridge circuit differ from each other, and there is a resultant output voltage from the bridge.

In the circuit of my invention, I utilize voltages appearing at the outputs of a number of the bridge networks for controlling the operation of the bill stripping and dispense mechanisms through relays R1 (FIGURE 5b) and R2–R5 (FIGURE 5a). Each of the relays has one or more armatures and associated contacts to be made or broken. For the sake of convenience, the switches constituted of the armatures and contacts of the various relays are labeled the same as the relays, with the switch positions or contacts indiacted as "a," "b," "c," etc.

Referring again to FIGURE 5b, the relay R1 is operated in response to the outputs of particular bridge networks to control the operation of the various other relays, solenoids and motors in a predetermined manner. The relay R1, which may be termed a detect relay, is connected in circuit with a trigger circuit 120, which is shown as a simplified Schmitt trigger. As illustrated, the trigger circuit 120 employs a pair of transistors 121, 122, shown as P-N-P junction transistors, which have their emitters 123, 124 coupled to ground through a common resistive connection 125. A load resistor 126 is connected between the collector 127 of the transistor 121 and a power supply terminal, B−, and the relay R1 has its control coil connected between the collector electrode 128 of the transistor 122 and the terminal B−. A base-collector connection 129 is provided between the transistor 122 and the transistor 121, and such connection 129 is resistively coupled to ground, as through a resistor 130.

The input to the trigger 120 is the base circuit of the transistor 121. Normally, i.e., in the absence of an input signal of predetermined magnitude, the transistor 121 is nonconducting, and the transistor 122 is conducting. Thus, the relay R1 is energized in the absence of an input signal of predetermined magnitude. But when a signal of such predetermined magnitude is applied to the base circuit thereof, the transistor 121 is rendered conducting and the transistor 122 is cut off, thereby de-energizing the relay R1.

For bill detection purposes, certain of the bridge circuits above described are coupled to the trigger 120. For example, as shown in FIGURE 5b, the resistors 101–105 and 108–111 have their sliding contacts coupled through respective diodes 131–139 to a common output lead 140. The diodes 131–139 are all connected in the same direction between the lead 140 and the respective sliding contacts so as to isolate each bridge circuit from the others.

The lead 140 is connected to a normally closed switch R2c, which is a switch operated by the relay R2. The switch R2c is connected to the input of the trigger 120, through an RC network comprising a resistor 141 and a capacitor 142. A sliding contact 143 for the resistor 141 is connected to the capacitor 142, and is adjustable so that a predetermined voltage developed across the capacitor 142 and the portion of the resistor 141 in parallel therewith to cause the trigger 120 to fire. As shown, the RC network is connected to a resistor 144 in the base circuit of the transistor 121.

In the circuit thus far described, it will be seen that the sum of the outputs of the bridge networks connected to the output lead 140 is applied to the input of the trigger 120. If the portions of the two bills passing over the cell pairs of the bridges coupled to the trigger 120 cause the resistance values of the associated photocells to vary equally, the combined outputs of the associated bridge networks remains at the minimum, which is a voltage below that necessary to fire the trigger 120.

Thus, if the bill to be compared is the same as the standard, the entire scanning movement is carried out without firing the trigger 120, and hence the relay R1 remains energized. On the other hand, if the bill to be compared is significantly different from the standard, along any lines scanend by the cell pairs, the output from one or more bridge networks is a voltage of sufficient magnitude to fire the trigger 120 and cause the relay R1 to be de-energized.

The relay R1 determines the operation of the remaining portion of the control network, to permit the operation for stripping and accepting a genuine bill, i.e., an accept or "compare" situation, or to signal a fail or "not compare" situation. Now the control network functions in response to the condition of the detect relay R1 will now be described with reference to FIGURE 5a along with FIGURE 5b.

As shown in FIGURE 5a, the relay R1 has a two-position switch for engaging one of a pair of contacts "a," "a'." Hereafter, reference will be made to such switch as the switch R1a when the "a" contact is engaged, and to the switch R1a' when the "a'" contact is engaged. When the relay R1 is de-energized, its R1a switch is closed, and when relay R1 is energized, its R1a' switch is closed. Thus, the switch R1a is closed in a fail or "not compare" situation, and the switch R1a' is closed in an accept or "compare" situation.

The relay R2 has its control coil connected to the switch R1a' through a normally closed switch R4b of the relay R4. If the relay R1 is energized when the switch 71 is closed by the sliding tray 12, whereby its switch R1a' is closed, the subsequent closure of the end switch 75 by the tray causes the control coil of the relay R2 to be connected across the buses 83, 85, i.e., the switch 75 upon being actuated by the tray is disconnected from the tray drive motor 38 and connected to the control coil of the relay R2. In this situation, a completed path through the control coil of the relay R2 is traceable through the switch 71, the switch R1a', the switch R4b, the relay control coil, the switch 75 and the switch 84.

As shown, the relay R2 has a switch R2b that is normally open, but which is closed upon energizing the relay R2 to connect the stripper solenoid 51 between the bus 83 and the switch 71. Since the switch 71 is closed at the time the relay R2 is energized, such closure of the switch R2b causes the solenoid 51 to be energized, whereupon the stripper blade 47 (FIGURE 1) is forced downwardly to cause the center portion of the bill in the receptacle 19 to be forced through the slot 45.

The relay R2 also has a two-position switch with contacts "a," "a'," to be referred to hereinafter as the switch R2a when the "a" contact is engaged, the switch R2a' when the "a'" contact is engaged. The switch R2a is closed when the relay R2 is de-energized, and the switch R2a' is closed when the relay R2 is energized. The stripper drive motor 60 is connected between the switch 75 and the switch R2a', so that when the relay R2 is energized to close the switch R2a', the stripper motor 60 is set into operation, whereby to cause the portion of the bill thrust through the slot 45 to be engaged and carried into the currency collection bin 46.

When a bill has been stripped and deposited in the collection bin, the stage is set for operating the dispense mechanism 66. In this connection, the dispense mechanism 66 may be a conventional type of mechanism employing a motor that is adapted to undergo a single revolution during which it causes an access door for an item or change reservoir to move from a center position, in which it closes off the reservoir from the chute 11, to an off-center position in which it permits an item to drop into the chute, and back to the center position to again close off the reservoir.

In FIGURE 5a, a dispense control motor 150 is shown connected between the bus 83 and one contact 151 of a switch 152 that is operated by the motor 150. The movable contact of the switch 152 is connected to the fixed contact of the scan-starting switch 71, and is normally, i.e., when the motor 150 is not energized, disconnected from the fixed contact 151 and in engagement with another fixed contact 153.

The relay R3 is utilized to effect operation of the dispense motor 150. As shown, the relay R3 has a two-position switch wherein an armature is adapted to engage one or the other of a pair of contacts "a," "a'," the operation of which will be described hereinafter as the switch R3a when the "a" contact is engaged, and the switch R3a' when the "a'" contact is engaged. The switch R3a is closed in the de-energized condition of the relay R3, and the switch R3a' is closed when the relay R3 is energized. The relay R3 has its control coil connected across the stripper motor 60, so that when the switch R2a' is closed in the manner previously described for energizing the stripper motor 60, the relay R3 is simultaneously energized.

The relay R3 is self-latching. Energizing the relay R3 causes the associated R3a' switch to be closed, thereby to connect the relay R3 through the switch 152 and the switch 71 so that it remains energized. The relay R3 also has a switch R3b connected to the dispense motor 150, such switch R3b normally being opened but closing upon the relay R3 being energized.

Th relay R3 remains energized throughout the scanning period until the bill is stripped from the tray. When a bill is stripped and deposited in the collection bin 46, the trigger 120 is fired and the relay R1 is de-energized. This operation is effected through the cell pairs 94—94' and 95—95', which are the cell pairs located immediately adjacent the slot 45 and on opposite sides thereof. As shown in FIGURE 5b, the bridge networks associated with these cell pairs are connected through diodes 154, 155 to the sliding contact 156 of a resistor 157 that is in series with the RC input circuit for the trigger 120.

The photocells of the cell pairs 94—94' and 95—95', and their associated bridge circuits, operate in the same manner as the cell pairs and the bridge circuits previously described. However, these cell pairs are substantially desensitized, so as to require direct illumination from the lamps 13, 14 in order that their bridge networks develop a sufficiently large output signal to fire the trigger 120. Since these photocells have to have their photosensitive elements exposed directly to the lamps, they form a "clear tray" signal source, in that they are unable to provide the signal required for firing the trigger 120 until the accepted bill has completely cleared the tray.

In the absence of such a strong "clear tray" signal, as where any portion of the bill to be removed continues to cover the photosensitive element of either of the cells 94' or 95', the dispense motor 150 will not be allowed to operate to dispense an item to the consumer. It should be noted that so long as the relay R2 remains energized, the associated switch R2a is open, and therefore the dispense motor 150, which is connected to the closed switch R3b and the contact 151 of the switch 152, is not connected to a power source for effecting its operation. Furthermore, as long as the relay R1 remains energized, the relay R2 is energized.

However, when a "clear tray" signal from the bridge networks employing the cell pairs 94—94', 95—95' causes the trigger 120 to fire, and the relay R1 is de-energized, the switch R1a' is opened, and the switch R1a is closed. Closure of the switch R1a connects the control coil of the relay R4 between the bus 83 and (through the switches R1a and 71) the bus 85, thus causing the relay R4 to be energized. The normally closed switch R4b of the relay R4 is thereupon opened. Accordingly, both of the switches R1a' and R4b in circuit with the relay R2 are disconnected therefrom, thereby to cause the relay R2 to be de-energized.

When the relay R2 is de-energized in the manner above explained, the switch R2a' is opened and the switch R2a is closed. Since the switch R3b has remained closed, following energization of the relay R3, closure of the switch R2a causes the dispense motor 150 to be connected through the switches R3b, R2a and 71 to the power source, whereupon the motor 150 operates to cause the dispense mechanism to deliver an item to the consumer.

When the motor 150 starts to operate, the switch 152 is thrown to the off-center position, thereby breaking contact with the fixed contact 153 and making contact with the fixed contact 151. By this operation of the switch 152, the relay R3 is disconnected from the power source and de-energized. However, the dispense motor 150 remains energized to continue its cycle, because it is connected to the power source through the switch 152 and the switch 71'.

At the end of the dispense cycle, the tray release solenoid 40 is energized to release the tray for its return movement to its extended position. For this operation, use is made of the relays R4 and R5. As shown in FIGURE 5a, the relay R5 has its control coil connected across the motor 38, and a normally open switch R5a is connected across the start switch 80. Thus, when the start switch 80 is closed to cause the motor 38 to be energized, the relay R5 is simultaneously energized. This action closes the switch R5a, thus keeping the motor 38 connected to the power source to permit the tray to be moved to its fully retracted position and latched, as previously described.

As shown, the relay R4 has a normally open switch R4c connected in series with a normally closed switch R5b of the relay R5, such switches being connected between the tray release solenoid 40 and the switch R3a of the relay R3. As previously explained, the switch R3a is closed at the end of the dispense operation. Also, the relay R4 is energized, so that the switch R4c is closed. Further, the switch 75 is positioned by the tray so as to be disconnected from the motor 38 and the relay R5, whereby the relay R5 is de-energized and the associated switch R5b is in its normally closed position. Since, at the end of the dispense operation, the switch 152 connects the fixed contact 153 to the scan starting switch 71, the solenoid 40 is energized, whereupon it releases the tray in the manner previously explained.

Accordingly, when the tray is released for return movement to its extended position, only the relay R4 remains energized. However, as soon as the tray releases the pushbutton 70, the switch 71 is automatically opened, thereby breaking the power connection to the relay R4, whereupon such relay is de-energized. The system is then ready for another cycle of operation.

The relay R4 also operates as a "fail" relay in the event that during the scanning of bills by the photocells, a sufficient signal is developed to fire the trigger 120 and cause the relay R1 to be de-energized. De-energization of the relay R1 at any time causes the switch R1a to close, whereupon the relay R4 is energized in the manner previously explained. Since the relay R4 is thus self-latching, it remains energized throughout the remainder of the cycle. And since the switch R4b is opened when the relay R4 is energized, the relay R2 cannot thereafter be energized for effecting the stripping and dispensing operations, i.e., the bill to be compared remains in its receptacle 19. Accordingly, at the end of the cycle, the relays R4 and R5 cooperate, in the manner previously explained, to energize the tray release solenoid 40 and free the tray for return to its extended position. The rejected bill can then be removed from the tray.

As previously mentioned, when a compared bill is found to be the same as the standard, it has to be passed completely through the slot 45 before the "clear tray" cell pairs are operative to effect a subsequent operation of the dispense mechanism. By this means, my system foils attempts to operate it so that it returns the compared bill to the owner along with coin or merchandise.

For example, suppose a person cuts a bill in half, places the halves in the receptacle 19, and tapes them in place at the ends of the receptacle. If such a bill were genuine, and of the same denomination as the standard, the normal sequence is carried out until the stripper solenoid 51 and the strip motor 60 are brought into operation. However, the stripper blade 47 cannot carry such a bill through the slot 45, and hence the photocells 94', 95' are still covered by the center portions of the bill. Accordingly, since the photocells 94', 95' are not exposed directly to the high intensity of illumination required for a "clear tray" signal to be developed, the dispense motor 150 would not be operated.

Another characteristic of the system is that if such a split bill, is in the receptacle 19, the tray 12 is not allowed to return to its extended position. In this connection, it should be noted that after an accepted bill is stripped in the normal operation of the system, the stripper solenoid 51 and the strip motor 60 are not de-energized, and the tray release solenoid 40 is not energized, until a "clear tray" signal is established. Accordingly, when the halves of a split bill are fastened in place as above described, the system operates in the usual sequence until the tripper solenoid 51 and strip motor 60 are energized, but proceeds no further. Therefore, the tray stays latched in its retracted position, and the tampered bill is not returned to the owner.

To prevent overheating of energized relays, solenoids and motors in the stalled situation just described, my invention includes a feature by which to disconnect the energized relays, solenoids and motors from the power source after a predetermined interval of time. For this purpose, I provide a heater element 160 (FIGURE 5a) between the bus 83 and the fixed contact of the scan-starting switch 71. The heater 160 may, for example, be a bi-metal element located adjacent the field winding of the strip motor 60, and is adapted to expand after current has been passing therethrough for a predetermined interval of time. The interval of time required to heat the heater 160 to the point of expansion is substantially greater than that required for the system to go through it normal cycle of operation (either to accept or reject a compared bill) and permit the tray to return to its extended position.

The heater 160 controls the position of the switch 84, as indicated by a mechanical connection 161 between the heater 160 and the movable contact of the switch 84. When the temperature of the heater 160 is below its expansion point, the switch 84 is in the position previously explained, wherein it connects the bus 83 to the scan-terminating switch 75. When the temperature of the heater 160 reaches the point to cause it to expand, the switch 84 is disconnected from the switch 75, thereby causing the relay R2 to be de-energized, and hence the stripper solenoid 51, the relay R3 and the strip motor 60 are de-energized.

However, although this operation causes the stripper blade to be retracted above the tray, the tray release solenoid 40 cannot be energized, and the tray remains locked in its retracted position. Thereafter, of course, it is necessary to service the system so that it can be used for the desired purpose, by removing the cover and manually retracting the plunger 41 of the tray release solenoid 40, thereby to allow the tray to return to its extended position.

Actuation of the switch 84 by its heater 160 in the manner above described also causes the trigger 120 in the relay R1 to be disconnected from the power source. As will be seen, the D.-C. power for the trigger 120 and the relay R2 is provided by a rectifier circuit 162 (FIG. 5a) to which line voltage is applied through a step-down transformer 163 that has its primary winding 164 connected across the switch 84. Thus, when the switch 84 is operated by the heater 160 in the manner above described, power from the A.-C. lines is disconnected from the transformer 163.

My system is also adapted to provide an alarm in the event that it locks up, or stalls, in the stripping operation. As shown in FIGURE 5a, an alarm circuit 165 is connected to one power lead 81, and is adapted to be connected to the bus 83 by the switch 84 when the heater 160 operates the switch 84 as described. When the alarm circuit 165 is thus connected between the line 81 and the bus 83, it is operable to signal an alarm, which may be a visual or audible alarm, or both.

Another unique feature of my invention is that it permits detection and aceptance of genuine bills of the proper denomination that have widely varying light transmission characteristics. For this purpose, and as shown in FIGURE 5a, the lamps 13–16 are arranged in pairs, in which the lamps 13, 14 (above the row 21 of photocells are connected in parallel, and the lamps 15, 16 in the other row 20 are also connected in parallel. The lamps 13, 14 and 15, 16 are in separate light control circuits, which are supplied with power through respective transformers 170, 171 that have their primary windings 172, 173 connected between the busses 83, 85.

In the light control circuit for the lamps 13, 14, use is made of photocell 174 in the row 21. The photocell 174 is connected in series with a parallel RC network 175, 176 across the secondary winding 177 of the transformer 170. As shown, the junction of the photocell 174 and the RC network 175, 176 is connected to the base electrode 178 of a transistor 179, and the emitter-base path of the transistor 179 is connected as through a bias resistor 180, across the RC network 175, 176. A silicon controlled rectifier 181 and a variable resistance means are connected in series across the secondary winding 177, and the rectifier 181 is connected across the lamps 13, 14. The variable resistance means is illustrated, by way of example, as a pair of ballast lamps 182, 183 connected in parallel.

To operate the silicon controlled rectifier 181, the transistor 179 has its collector electrode 184 connected to the voltage control point electrode 185 of the rectifier 181. The transistor is normally conducting, so that the potential at the voltage control point 185 of the rectifier 181 is made to follow the potential variations on the base 178 of the transistor 179.

The light control circuit for the lamps 15, 16 is identical to that of the light control circuit for the lamps 13, 14, except that a photocell 188 from the row 20 is utilized in the position corresponding to that of the photocell 174 in the control circuit for the lamps 13, 14. All other elements in the control circuit for the lamps 15, 16 are illustrated by primes of the numbers of the corresponding elements in the circuit for controlling the lamps 13, 14.

Only the operation of the light control circuit for the lamps 13, 14 will be described in detail, it being understood that the light control circuit for the lamps 15, 16 operates in the same manner. As in the case of the photocells previously described, the resistance of the photocell 174 varies inversely as the intensity of the light impinging upon its photosensitive element. Such resistance variations are utilized by the RC network 175, 176, the transistor 179, and the ballast lamps 182, 183 to effect conduction of the rectifier 181.

When the rectifier 181 conducts, it acts as a shorting current path to prevent current from passing through the lamps 13, 14, thereby to control the brightness of the lamps 13, 14. In this latter connection, it should be noted that the degree of brightness of the lamps 13, 14 depends upon the fraction of each cycle of the line voltage through which current passes through the lamps 13, 14. Thus, if the current passes through the lamps 13, 14 throughout three-quarters of each cycle of the line voltage, the light will be brighter than if current passes therethrough during only half of each cycle.

Regarding the transistor 179, the voltage applied to the base 178 will have a phase relation, with respect to the voltage across the secondary winding 177, that is dependent upon the time constant of the combination of the resistance of the photocell 174 and the capacitance of the capacitor 176. Since the capacitance remains constant, and the resistance of the photocell 174 varies with the intensity of the light impinging upon its photosensitive element, the phase of the voltage applied to the base 178 of the transistor 179 varies with respect to the voltage across the secondary winding 177.

Figure 6A:
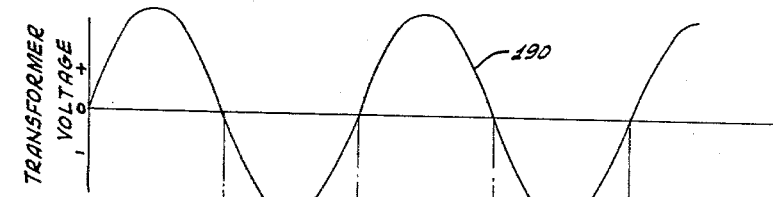
FIGURES 6a–6e are voltage waveforms that aid in explaining the operation of the automatic light control network of FIGURES 5a and 5b.
Figure 6B:
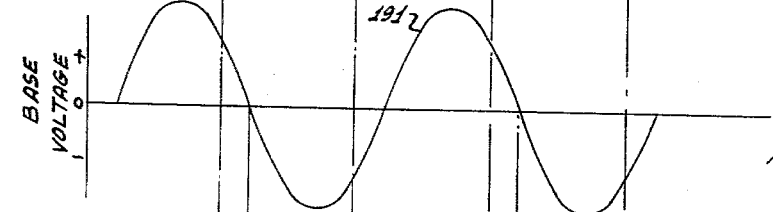
Figure 6C:
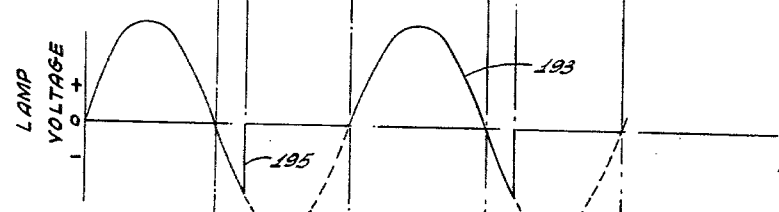
Figure 6D:
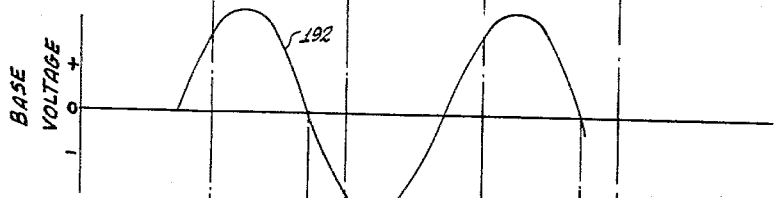

Further in this connection, the phase shift varies directly with the change in the resistance of the photocell 174. This relationship is indicated in FIGURES 6a–6c. In FIGURE 6a, the wave form of the voltage across the secondary winding 177 is indicated at 190, and in FIGURES 6b and 6d, voltage waveforms 191, 192 illustrate the transistor base voltages for the respective situations wherein the resistance of the photocell 174 is relatively low, as for a small phase shift (the lamps 13, 14 are relatively bright), and high, as for a large phase shift (the lamps 13, 14 are dim).

Although the voltage variations on the control point electrode 185 of the rectifier 181 follow the variations in the base voltage of the transistor 179, the rectifier can conduct only during one-half cycle of such voltage variations, e.g., the negative half-cycle. And the point at which the rectifier 181 conducts, relative to the voltage across the secondary winding 177, determines the period within a cycle of the voltage across the secondary winding 177 that the lamps 13, 14 are illuminated.

In the case where the illumination on the photocell decreases, it is desired to have the rectifier 181 conduct at a later point in each cycle of the voltage from the secondary winding 177, so that the lamps 13, 14 are supplied with power a greater portion of the time, and hence will brighten. But where the illumination on the photocell 174 increases, it is desired to fire the rectifier 181 earlier in each cycle of the voltage from the secondary winding 177, so that less average power is supplied to the lamps 13, 14, and they are dimmed.

Figure 6E:
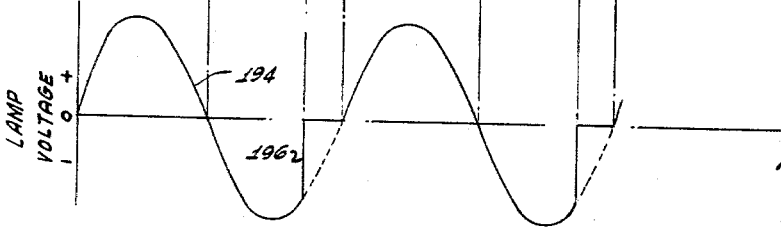

To better understand the operation of the automatic light control circuit for this purpose, reference will be made to FIGURES 6c and 6e along with FIGURES 6a–6c. In FIGURES 6c and 6e, voltage waveforms 193, 194 are shown that indicate the portions of the cycles of the voltage across the secondary winding 177 during which the lamps 13, 14 are supplied with power. The voltage 193 represents the period of illumination of the lamps for the situation wherein the illumination of the cell 174 has increased, and the voltage 194 in FIGURE 6e represents the situation wherein the illumination of the photocell 174 has decreased. As shown, the voltage 193 reduces to zero, i.e., the rectifier 181 conducts, at a point 195 early in the negative half cycles, and the voltage 194 reduces to zero at a point 196 later in the negative half cycles.

The ballast lamps 182, 183 serve to aid in the control of the illumination by the lamps 13, 14. Such lamps operate in conventional fashion, so that their resistance varies directly with the current therethrough. Thus, for a given magnitude of the voltage from the secondary winding 177, the longer the period during each cycle that the rectifier 181 conducts, so as to shunt the lamps 13, 14 and cause all the current to flow through the lamps 182, 183, the greater does the resistance of the lamps 182, 183 become. Due to heating, such high resistance decreases gradually during the period when the rectifier 181 is cut off, so as to reduce current flow and enhance the dimming of the lamps 13, 14.

In the same manner, when the rectifier 181 is made to conduct during only a short portion of the cycle of the voltage from the secondary winding 177, so as to increase the illumination of the lamps 13, 14, the short-circuit currents through the ballast lamps 182, 183 do not last for a sufficiently long period to cause their resistances to increase markedly. Accordingly, the lamps 182, 183 in this situation are relatively ineffective to reduce the current fed through the lamps 13, 14.

To better understand the utility of my light control means, consider a situation wherein, without such light control, a genuine bill of the same denomination as the standard, but with markedly different light-transmission characteristics, is placed in the receptacle 19. During scanning movement, the photocells in the row 21 vary in resistance in the same manner as those of the row 20, but to a different degree. Thus, for a bill that is quite opaque compared to the standard, the resistances of the photocells in the row 21 will be much greater than those of the row 20. Similarly, a bill that is considerably more transparent than the standard causes the resistances of its scanning photocells to vary about a much higher level than those of the row 20 that scan the standard. The bridge networks in such situations develop output voltages that operate the relay R1, whereby to reject the bill.

However, my light control means changes the illumination as necessary so that the cells of the row 21 are exposed, through such relatively opaque and transparent genuine bills, to light intensity variations sufficiently like those to which the cells of the row 20 are exposed (through the standard) that the bridge networks do not operate the relay R1 and cause the bills to be rejected. In this connection, it is to be noted that although current is supplied to the lamps 13–16 during portions of the line voltage cycles, the illumination by the lamps is continuous, their brightness depending upon the average power supplied thereto.

It will be seen that if my light control means alters the brightness of the lamps for all unknown bills, i.e., both bogus and genuine. This means that the resistances of the photocells in the row 21 are caused to vary about the same level as those in the row 20, for both bogus and genuine bills. And since the bogus bills cause the resistances of the photocells of the row 21 to follow a different pattern from those of the row 20, the measuring bridge networks readily develop the resultant output needed to de-energize the relay R1 and cause the bills to be rejected.

It should be noted that my bill comparison and detection system can be used as it stands for any desired standard, i.e., no change in circuits is needed to effect the comparison and detection of other items with the selected standard. For example, at different times bills of different denominations may be placed in the receptacle 18 for the standard. For the different standards, the photocells of the row 20 have different patterns of resistance variations. However, for each standard, when a genuine bill of the same denomination is placed in the receptacle 19, the photocells of both rows 20, 21 have the same pattern of resistance variations. Thus, the measuring bridge networks do not develop a signal that causes the relay R1 to be de-energized, and the system proceeds with its normal sequence of operations.

It will be understood that the stripper blade and slot arrangement shown and described herein is illustrative only. The stripper blade and slots may be located in positions other than shown, e.g., adjacent one edge of the bill, and still operate as desired. Furthermore, other suitable means for stripping a bill from the tray may be utilized in my system. For example, friction roller means below the tray may be adapted for movement against the bill. With a slot located at the end of its receptacle, the bill is forced by the roller means to pass through the slot.

Whatever the means employed for stripping a bill from its receptacle, it will be understood that the "clear-tray" detecting photocells are positioned adjacent the opening through which the bill passes out of its receptacle. In the case of a slot located at the end of the receptacle, there is need for only one "clear-tray" signalling circuit of the type shown and described herein.

The tray for carrying the standard and unknown bills also need not be flat. For example, a curved support may be used that has arcuate receptacles in which the bills are placed. The photocells are suitably positioned adjacent the support, so that by the time the support has been rotated through a sufficient angle that the bills are compared, an accepted bill is stripped from its receptacle, e.g., in a manner as disclosed herein.

As will be recognized, the arcuate support above mentioned may in one form be a drum, which may be transparent and interiorly lighted. For stripping a bill from such a drum, suitable wiping means may be employed.

A still further arrangement in the scope of my invention is one in which the rows of photocells are spaced on the same line, rather than on parallel lines as shown and described herein. In such a modified arrangement, the photocells are arranged on a line or lines so as to extend transversely of the tray, and the bills are supported side-by-side for longitudinal movement over their associated photocells. For stripping in such an arrangement, the slot through which the bills is to pass is parallel to the lines of the photocells, and the stripping means is appropriately arranged to force the bill through the slot. Also, only one "clear-tray" detection circuit is needed in such an arrangement.

It should also be noted that the rate of movement of the bills for scanning purposes may be constant or variable. It is sufficient for the purposes of my invention, that the bills be scanned along a plurality of parallel lines, so as to provide a plurality of signal fluctuations along corresponding lines on both bills for comparison purposes. Therefore, any suitable scanning movement may be employed that permits the desired comparison.

Still further, the illumination means shown herein may take a variety of forms. For example, the lamps may be horizontally disposed, with reflectors located over the photocells so as to direct the light downwardly thereon. Or, the cells may be supported above the bills, and the light source located below the tray.

From the foregoing, it will be apparent that although I have illustrated and described a particular embodiment in detail, it will be seen that various modifications can be made therein without departing from the spirit and scope of my invention. Accordingly, I do not intend that my invention shall be limited, except as by the appended claims.

I claim:
1. Apparatus for comparing an unknown paper item with a standard paper item comprising: two spaced groups of photocells, the number of photocells in each group being the same, each group having respective photocells individually paired with a photocell to form a plurality of sets of paired photocells of the other group, the paired photocells being spaced a fixed distance apart along a line; means for supporting a standard bill and an unknown bill of like dimensions in fixed spaced relation for unitary movement past the respective groups of photocells, said bills in movement having corresponding portions passing respective ones of the paired photocells; illumination means in fixed spaced relation to said photocells positioned so that light therefrom reaches all the photocells via the bills; individual bridge circuits, each including a set of said paired photocells; and trigger means commonly connected to all of said sets of paired photocells to detect differences in the resistance values of one or more of said photocell sets during the passage of said bills, thereby to detect differences between the bills.

2. Apparatus as defined in claim 1, wherein said supporting means includes a tray having receptacles in which to hold the respective bills; means for moving said tray from a first position to a second position so that the bills move past the respective groups of photocells; and means operable in said second position of the tray to remove the unknown bill from its receptacle when no substantial difference between resistances of the photocells is detected.

3. A system for comparing an unknown bill with a standard bill comprising: a flat tray having a pair of spaced rectangular receptacles of equal size in side-by-side relation, the dimensions of said receptacles being substantially the same as the dimensions of the bills; a support plate having a flat surface on which the tray is slidably supported, said plate having a slot therein; means normally biasing said tray to a first position on said plate; driving means for moving said tray from said first position to a second position, the receptacle for the unknown bill being located adjacent said slot when the tray is in said second position; manually operable switch means for connecting said driving means to a power source to move said tray to said second position; two groups of spaced light-sensitive variable resistance devices located in said plate and having light-sensitive elements adjacent the flat surface thereof, the distances between corresponding resistance devices in the groups being the same as the distance between corresponding edges of said receptacles, said groups being arranged so the respective bills pass thereover upon movement of the tray to its second position; a source of illumination adjacent said plate for illuminating said resistance devices; comparing means in circuit with corresponding resistance devices of said groups to continuously develop output signals when there are differences in their resistances, as the tray moves from said first to said second position, stripping means operable when said tray reaches its second position for moving the unknown bill out of its receptacle and through the slot in said plate; and means controllable by said comparing means to permit operation of said stripping means only when said output signals have not reached above a predetermined magnitude during the passage of said tray to said second position.

4. A system as defined in claim 3, including: a dispense mechanism; motor means for operating said dispense mechanism; light-sensitive variable resistance means supported by said plate adjacent said slot, and adapted to be exposed directly to said illumination source only upon the entire bill moved by the stripping means being passed completely through said slot; and means responsive to the resistance change in said resistance means being exposed directly to said illumination source to effect operation of said motor means for operating said dispense mechanism.

5. A system as defined in claim 4, including: means to latch said tray in said second position prior to operation of said stripping means; and means responsive to operation of said dispense mechanism to actuate said latching means for unlatching said tray and allowing said bias means to return it to its first position.

6. A system as defined in claim 5, including: a transformer having a primary winding for connection to a power source, said transformer having a secondary winding with a center-tap connection to a point of reference potential; means connecting each pair of corresponding resistance devices in series across said secondary winding, said connecting means including a voltage pickoff device intermediate the series-connected devices; and means connecting said voltage pickoff devices together.

7. A system as defined in claim 6, including: a resistive element having a sliding contact; means connecting said sliding contacts to a common point; respective means connected between said common point and each sliding contact to isolate the bridge circuits from each other; and a trigger circuit having two states of operation, said trigger circuit normally being in one state of operation, said trigger circuit being coupled to said common point and responsive to signals of predetermined magnitude at said common point to change to its other state of operation.

8. A system as defined in claim 7, including: a relay device to be energized in response to operation of said trigger circuit in said other state of operation; electro-mechanical apparatus adapted for connection to a power source; and switching means operable by said relay device for connecting said electro-mechanical apparatus to said source.

9. A system as defined in claim 8, including: means, operable during operation of said stripping means, to prevent operation of said latch activating means until a bill has passed completely through said slot.

10. A system as defined in claim 9, including respective lamp means of said illumination source for illuminating said resistance devices and resistance means; additional light-sensitive variable resistance means supported in said plate to be passed over by the respective bills; and automatic light control means for causing the light intensities on said additional resistance means to be substantially the same throughout movement of the bills thereover.

11. A system as defined in claim 10, wherein said light control means includes, for said additional resistance means: a photocell; a capacitor in series with said photocell; an A.C. source connected across said photocell and capacitor; a transistor having a base circuit coupled to the junction of said photocell and said capacitor; a semiconductor diode in parallel with said photocell and capacitor, said diode being the type that has a control point electrode; an emitter-collector current path for said transistor connected in circuit with said control point electrode; and means connecting a respective lamp means across said diode.

12. In combination: a source of illumination; means for supporting a standard paper bill and an unknown paper bill in fixed spaced relation so both are illuminated from said source; circuit means including first and second light-variable resistance means in fixed spaced relation positioned adjacent corresponding portions of the two bills; means to effect relative movement of said resistance means and the bills to cause varying signals to be developed in said circuit means in response to varying light-responsive portions of the bills passing said resistance means; means responsive to said signals to develop one indication when they are substantially the same, that the unknown is like the standard, and to develop another indication, when they are substantially different, that the unknown is not like the standard, wherein said source of illumination and said resistance means are on opposite sides of the bills, and the moving means causes said bill supporting means to move past said resistance means, including automatic control means for said illumination source to cause the light passing through the bills to impinge upon said resistance means with substantially the same intensity, and in which said automatic control means comprises: a photocell; a capacitor in series with said photocell; an A.C. source connected across said photocell and capacitor; a transistor having a base circuit coupled to the junction of said photocell and said capacitor; a semiconductor diode in parallel with said photocell and capacitor, said diode being the type that has a control point electrode; an emitter-collector current path for said transistor connected in circuit with said control point electrode; and a source of illumination including a lamp connected across said diode.

13. A bill changer adapted to test, validate and accept, and thereafter to exchange credit for a bill having been accepted; comprising a plurality of light-responsive, signal-emissive cells adjacent the bill in test to respond to the surface characteristics of the bill in test; a trigger circuit commonly connected to all said cells and assuming a first condition in response to a signal from any one of said cells indicative of a spurious bill in test, and means responsive to the trigger circuit assuming its first condition for rejecting the bill in test and for summarily terminating the test thereupon; said trigger circuit assuming a second condition in the absence of a signal from any of said cells for accepting a valid bill in test, means operative only on said trigger circuit remaining in said second condition during a bill test for causing removal of the bill from test, said cells transferring said trigger circuit from said second condition to said first condition consequent to the successful removal of the bill, and means responsive to only said trigger circuit reaching the first condition consequent to said bill removal for exchanging credit for the accepted bill.

14. A bill changer adapted to test, validate and accept; and thereafter to exchange credit for a bill having been tested, determined to be valid and accepted; comprising a plurality of light-responsive, signal-emissive cells adjacent the bill in test for responding to the surface characteristics of the bill in test; a trigger circuit commonly connected to all said cells and active in response to a signal from any one of said cells to cause the rejection of a spurious bill in test, said trigger circuit being inactive in the absence of a signal from any of said cells for accepting a valid bill in test, a bi-stable relay in said trigger circuit, said relay being in a first stable state with the trigger circuit in its active condition and being in a second state with said trigger circuit in its inactive condition; means governed by the relay maintaining its second state during a bill test for causing removal of the bill from the test position; means for terminating the bill test successfully only on said relay maintaining its second state during the entire duration of the test, said relay thereafter assuming its first state only consequent to the successful removal of the bill from test, and means responsive only to said relay being in its first state after the removal of the bill for exchanging credit for the accepted bill.

15. A bill changer adapted to test, validate and accept; and thereafter to exchange credit for a bill having been tested, determined to be valid and accepted; comprising means for moving the bill to be tested to traverse a test area, a plurality of signal-emissive cells responsive to characteristics of the bill in test, said cells positioned adjacent the bill for scanning the bill as it traverses the test area; a trigger circuit commonly connected to all said cells and assuming a first condition in response to a signal from any one of said cells to cause the rejection of the bill in test as spurious and terminating the test thereupon, said trigger circuit assuming a second condition in the absence of a signal from said cells for accepting the bill in test as valid; means for terminating said bill traverse to end the test period, means operative only on the trigger circuit remaining in its second condition for the duration of the bill traverse for causing removal of the valid bill from the test position; and means for continuing the scan of the test area by cells of said plurality following successful removal of a valid bill from the test area, said cells emissive of a signal on the completion of the removal of the bill from the test area to cause said trigger circuit to assume its first condition to initiate the exchange of credit for the removed bill.

16. A bill changer for testing and validating a bill in test, comprising a plurality of light-responsive, signal-emissive cells adjacent the bill in a test position for responding to characteristics of the bill in test; a trigger circuit commonly connected to all said cells and assuming a first condition in response to a signal from any one of said cells to cause the rejection of the bill in test, said trigger circuit assuming a second condition on the absence of a signal from said cells for accepting the bill in test; means for signalling the termination of a test; means operative only on said trigger circuit being in the second condition throughout a bill test and remaining in said second condition during the test termination signal for initiating removal of the accepted bill from the test position; and means responsive to the operation of said removal initiating means for disconnecting certain of said cells from said trigger circuit, the remaining cells emissive of a signal on the successful removal of the bill in test from the test position to cause said trigger circuit to assume its first condition.

17. A bill changer for testing and validating a bill in test, comprising a plurality of signal-emissive, light-responsive cells adjacent the bill in a test position for responding to the characteristics of the bill in test, to cause rejection or acceptance of said bill; means for starting the operation of said changer to test the bill in said test position; means operative on the acceptance of the bill in test for initiating removal of the accepted bill from the test position; means responsive to the operation of said last-mentioned means for continuing the test of said test position by said cells; means operated on the initiation of said removal and maintained in operation until the removal is successfully concluded; and timing means operative on the removal being unsuccessfully concluded for latching said bill changer against subsequent operation.

18. A bill changer adapted to test and validate a bill in test, comprising, means for moving a bill to a test position, means for holding the bill in the test position, a plurality of light-responsive, signal-emissive cells adjacent the bill in the test position for responding to the characteristics of the bill in test, a trigger circuit commonly connected to said cells and assuming a first condition in response to a signal from any one of said cells to cause the rejection of the bill in test, said trigger circuit assuming a second condition in the absence of a signal from said cells for thereafter accepting the bill in test, means for signalling the termination of the test, means operative only on said trigger circuit being in the second condition throughout the bill test and remaining in said second condition during the test termination signal for initiating removal of the accepted bill from test, means responsive to the operation of said removal-initiating means for disconnecting certain of said cells from connection to said trigger circuit, the remaining cells maintaining said trigger circuit in said second condition when said bill is not removed from test, and means responsive to the concurrence of the initiation of removal and of said trigger circuit remaining in its second condition for maintaining said holding means in the test position pending manual reset thereof.

19. A machine for comparison testing an unknown bill against a standard bill for validity; comprising: means for holding said unknown and said standard bill for joint movement through a test area; a plurality of light-responsive cells adjacent both said bills in the test area, said cells disposed in separate bridge circuits with one cell in a bridge circuit adjacent a point in said unknown bill and the other cell in said bridge circuit adjacent a like point in said standard bill, each said bridge circuit being balanced on like responses from both cells of the respective bridge circuit during movement of the bills past the cells to thereby indicate the unknown bill to be valid, one or more of said bridge circuits being unbalanced by unlike responses from said standard or unknown cells to indicate the unknown bill to be a spurious one; means responsive to unbalance in one or more of said bridge circuits greater than a predetermined amount for restoring said holding means to release the bill indicated to be spurious; and output means responsive to balance in all said bridge circuits for causing removal of a bill found to be valid by the continuous balanced condition of said bridge circuits during the entire bill movement.

20. A machine for comparing an unknown bill with a standard bill to therby test said unknown bill for validity; comprising: means for holding said unknown and said standard bills in side-by-side relationship; means for initiating movement of said holding means to pass both said bills simultaneously through a test area; a plurality of light responsive cells adjacent both said bills in the test area, said cells disposed in separate two-cell bridge circuits with one cell in a bridge circuit adjacent a point in said unknown bill and the other cell in each bridge circuit adjacent a like point in said standard bill, each of said bridge circuits being balanced on like responses from the respective cells of the bridge circuit during movement of the bills past the cells, one or more of said bridge circuits being unbalanced on unlike responses from the respective cells of the brdge; output means common to all said bridge circuits and responsive to unbalance in one or more of said bridge circuits for restoring said holding means summarily to release an invalid bill; an accept circuit; means operated by the unknown bill having been moved through the test area without unbalance in one or more of said bridge circuits for preparing the accept circuit to thereby indicate the unknown bill to be valid; and means in said accept circuit responsive to the coincidence of operation of said preparing means and to continued balance in all said bridge circuits for causing removal of a bill found to be valid.

References Cited by the Examiner

UNITED STATES PATENTS

| | | | |
|---|---|---|---|
| 1,922,188 | 8/33 | Zworykin | 250—210 |
| 2,026,330 | 12/35 | Tauschek. | |
| 2,138,645 | 11/38 | Rey | 209—82 |
| 2,251,828 | 8/41 | Hammond. | |
| 2,796,530 | 6/57 | Phillips | 250—205 |
| 2,842,672 | 7/58 | Thomsen | 250—205 |
| 2,896,763 | 7/59 | Gisser | 194—4 |
| 2,898,801 | 8/59 | Rokafellow. | |
| 2,922,891 | 1/60 | Turner | 250—205 |
| 2,922,893 | 1/60 | Ett. | |
| 2,950,799 | 8/60 | Timms | 194—4 |
| 2,957,387 | 10/60 | Patzer | 194—4 |
| 3,031,076 | 4/62 | De Claris. | |

SAMUEL F. COLEMAN, *Acting Primary Examiner*.

ERNEST A. FALLER, JR., *Examiner*.